April 28, 1970 D. C. UNION 3,509,326
CLOSED LOOP CONTROL SYSTEM WITH ADAPTIVE FILTER
Filed Feb. 23, 1965 3 Sheets-Sheet 1

INVENTOR.
DONALD C. UNION
BY Elmer Gilbert
ATTORNEY

United States Patent Office 3,509,326
Patented Apr. 28, 1970

3,509,326
CLOSED LOOP CONTROL SYSTEM WITH
ADAPTIVE FILTER
Donald C. Union, Los Gatos, Calif., assignor to International Business Machines Corporation, Armonk, N.Y., a corporation of New York
Filed Feb. 23, 1965, Ser. No. 434,347
Int. Cl. G06g 7/66; G06f 15/46
U.S. Cl. 235—151.1                                    5 Claims

ABSTRACT OF THE DISCLOSURE

This invention relates to a method of feedback control wherein the feedback signal has a constraint placed on the rate at which it may change. If the feedback signal changes at a rate greater than the limit, the additional change is ignored. The magnitude of the limit at any particular time is a function of the magnitude of the error signal in the system at a prescribed preceding time. Thus, the magnitude of the error signal at any particular time limits the allowable magnitude at a succeeding time.

---

The present invention relates to automatic control and more particularly to a method of closed loop control.

Various noise signals often cause considerable difficulty in closed loop control systems. Closed loop control systems can be made insensitive to various types of noise by decreasing the sensitivity of the system; however, decreasing the sensitivity of a system also decreases its speed of response which is in general undesirable. The present invention provides a unique method of control whereby a control system is made somewhat insensitive to spurious noise without appreciably decreasing the sensitivity of the system under critical conditions.

The method of the present invention involves limiting the rate of change of the feedback signal in the control system. If the feedback signal changes at a rate greater than the limit, the additional change is ignored. The magnitude of the limit in any particular time period is a function of the magnitude of the error signal in the system during the preceding time period.

The method of the present invention is applicable to a closed loop control system that operates upon an error signal and it includes the steps of:

Measuring the condition of a variable to generate a raw input signal; generating a smooth input signal from said raw input signal by limiting the rate of change of said raw input signal, the limit on the rate of change of said signal in any time period being a function of the magnitude of the error signal in the preceding time period, except that when the magnitude of the error signal in any time period is below a prespecified magnitude said limit in the next time period is said prespecified magnitude; generating an error signal which represents the difference between said smooth input and a desired value of said variable; and generating a control signal in response to said error signal.

An object of the present invention is to provide an improved method of closed loop control.

Another object of the present invention is to provide an improved method of closed loop control whereby the output of the system is relatively insensitive to spurious noise.

Yet another object of the present invention is to provide a method of control whereby the sensitivity of the system can be easily varied.

Yet another object of the present invention is to provide an improved method of non-linear control.

Still a further object of the present invention is to provide a method of non-linear control which can be easily implemented by a digital computer.

Another object of the present invention is to provide a method of closed loop control whereby control action is taken quickly in response to set point changes and slowly in response to changes in the feedback signal caused by other factors.

Another object of the present invention is to provide a method of closed loop control which includes the step of passing the feedback signal through a filter that has a response curve which approximates a positive exponential.

The foregoing and other objects, features and advantages of the invention will be apparent from the following more particular description of preferred embodiments of the invention.

Figure 1:
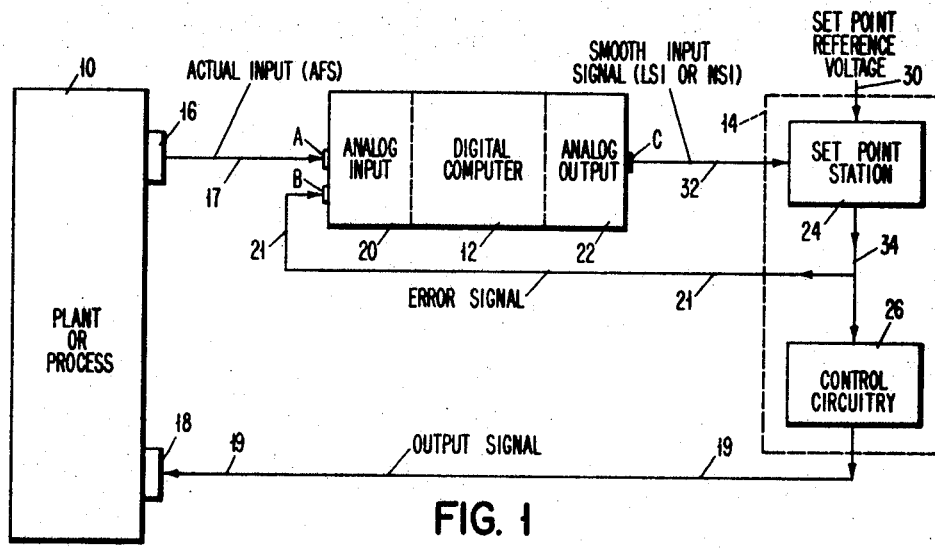
FIGURE 1 shows an overall view of a system wherein the method of control according to the present invention can be practiced.

The system shown in FIGURE 1 includes a plant or process 10 which is being controlled, a digital computer 12 and an analog controller 14. The exact nature of the plant 10 is irrelevant to the present invention. The only fact about plant 10 which is relevant to the present invention is that associated with the plant 10 is a sensing and transmitting mechanism 16 and a control mechanism 18. Control mechanism 18 controls plant 10 in response to signals on line 19. The state or condition of plant 10 is sensed by device 16 and a signal is generated on line 17 in accordance therewith. For example, plant 10 can be a tank, control mechanism 18 can be a valve which controls the flow into the tank and sensing mechanism 16 can be a level sensing device. The simplicity or complexity of plant 10 is irrelevant to the present invention.

The digital computer 12 can be any commercially available process control computer such as the IBM 1710 System. Such computers have associated therewith analog input equipment 20 and analog output equipment 22. The digital computer 12 can therefore receive analog signals from inputs A and B and it can generate an analog signal at output C. Analog controller 14 includes a set point station 24 and control circuitry 26. The set point station 24 receives a feedback signal from line 32 and a reference signal on line 30 and it generates the difference between these two signals on line 34. Control circuitry 26 generates a control signal on line 19 in accordance with the signal on line 34. The control circuitry 26 is conventional circuitry which produces a signal on line 19 which bears a proportional, derivative, and integral relationship to the signal on line 34. Analog controller 14 can, for example, be a Foxboro (TM) electronic controller. In this case the signal on line 34 represents the signal in the controller which goes to the deviation meter.

The signal on line 34 is what is generally termed the ERROR SIGNAL in an analog controller and the magnitude of this signal represents the difference between the set point value (i.e. the desired value) and the magnitude of the signal on the input line 32. One important aspect of the present invention is that digital computer 12 senses the magnitude of the error signal in the analog controller through line 21 and input B.

Figure 2A:
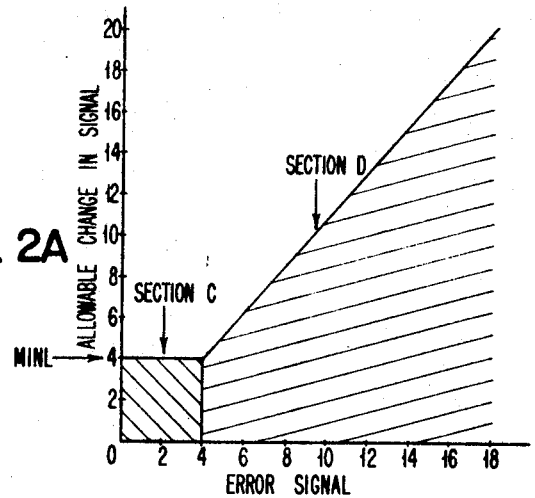
FIGURE 2A is a graph showing the limit imposed on the rate of change for various magnitudes of error signal.

In general, the digital computer 12 passes the signal which appears at its input A to its output C. However, as will be explained in detail later, computer 12 acts as a low pass filter so that the signal on line 32 is not always equal to the signal on line 17. In certain cases computer 12 does not change the signal on line 32 at a rapid rate even though the signal on line 17 changes rapidly. The maximum allowable rate of change which the computer 12 allows is variable and the magnitude of the limit on the rate of change depends upon the magnitude of the error signal at line 21. FIGURE 2A shows the allowable rate of change of the signal on line 32 relative to the magnitude of the error signal. In general, as shown by the portion of the curve designated section D, the maximum allowable rate of change is equal to the magnitude of the error signal. However, as shown by section C of the curve, the allowable rate of change is never less than a minimum limit, herein shown as four units. This minimum limit is designated MINL. Thus, when the error signal is between zero and four units the maximum allowable rate of change of the signal on line 32 is four units and when the error signal is greater than four units the maximum allowable rate of change of the error signal is equal to the magnitude of the error signal. The value of MINL for any specific system can be established by trial and error until the desired type of response is obtained. The same procedure as used to tune the gain settings in conventional controllers can be used.

The digital computer 12 interrogates inputs A and B ten times per second. Each time inputs A and B are interrogated, the computer performs various calculations which will be explained later. These calculations determine a new value for the signal on line 32 and after performing the calculations the computer appropriately adjusts the analog signal at output C so that it conforms to the desired value. With an IBM 1710 System, the time required to interrogate inputs A and B, to perform the necessary calculations, and to activate output C in accordance with the results of the calculations is in the order of magnitude of fifteen milliseconds. Thus, one IBM 1710 computer with a large number of analog input points and a large number of analog output points can be time shared by a number of control loops. For simplicity, the following description will relate to a system wherein all of the computer's time is devoted to a single analog loop as shown in FIGURE 1.

Figure 2B:
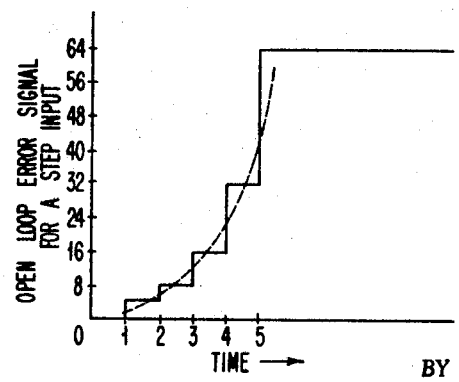
FIGURE 2B is a graph which shows the open loop response curve of the filter.
Figure 2C:
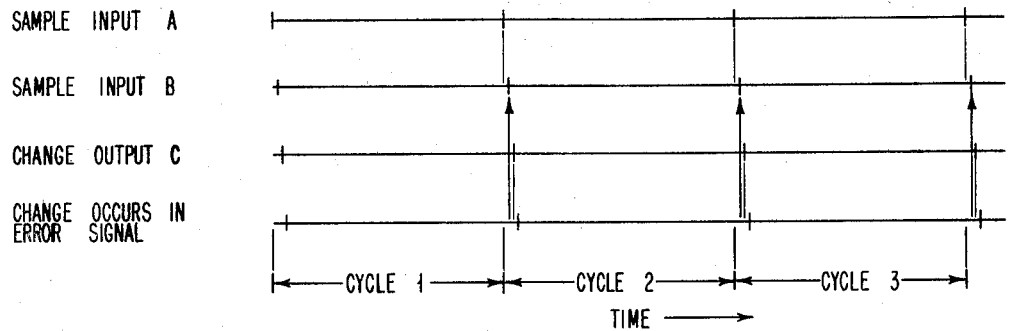
FIGURE 2C is a chart showing the time relationship between the various signals.

The time cycle in the operation of computer 12 is shown in FIGURE 2C. During the first part of each cycle, inputs A and B are interrogated, calculations are performed and the output C is activated in accordance with the results of the calculation. This requires about fifteen ms. During the remaining portion of the cycle, the computer performs no further operations that are directly related to inputs A and B. Approximately one tenth of a second later the cycle is repeated. The time scale of FIGURE 2C is not meant to be an accurate time scale but is merely for the purposes of illustration. The first line shows the times at which input A is sampled, the second line shows the times at which input B is sampled, the third line shows the times at which output C is changed, and the last line shows the times at which a change occurs in the ERROR signal on line 34. The above description assumes that the set point reference on input 30 is not changed. If the set point reference is changed at anytime the magnitude of the ERROR signal changes immediately. The time scale is broken down into cycles, three cycles being shown in FIGURE 2C. During each cycle the computer samples inputs A and B and if necessary, changes the signal on output C. Any change in the signal at output C is naturally reflected on the ERROR signal at line 34. An important point is that during each cycle the computer samples the magnitude of the ERROR signal through input B which prevails during the previous cycle. This is indicated in FIGURE 2C by the arrows going from the fourth line to the second line. During each cycle the computer uses the magnitude of the ERROR signal during the preceding cycle in its calculations, the results of which are used to establish the magnitude of the signal on output C (hence, the magnitude of the ERROR signal) which is maintained during the succeeding time period. As indicated above, when the set point reference voltage is changed the magnitude of the ERROR signal changes immediately to reflect the new set point reference. Furthermore, on the next cycle the magnitude of the limit on the rate of change of the feedback signal is established by the magnitude of the new ERROR signal. Thus, the system responds very quickly to changes in the set point reference voltage. However, if the magnitude of the feedback signal changes for any other reason the system responds relatively slowly. The length of each cycle (i.e. the sampling rate) is chosen so that it is relatively slow with respect to the frequency of noise signals which are to be eliminated. Yet it must be fast enough to follow changes in the process and changes in the set point.

In the following description various quantities are indicated by abbreviated designations. These abbreviations and the quantities which they represent are tabulated below.

AFS—(Actual Feedback Signal)—The magnitude of the analog signal at line 17 when input A is sampled.

ERROR—(Error Signal)—The magnitude of the analog signal on line 21 when input B is sampled.

LIMIT—The maximum amount that the signal on line 32 can change during any particular cycle.

MINL—(Minimum Limit)—This is the minimum allowable value for the quantity LIMIT. The value of the quantity MINL is established initially when the system is set up. During the operation of the system it is merely a number which is used repeatedly to represent the minimum allowable value of the quantity LIMIT.

RDI—(Raw Delta Input)—The difference between the magnitude of the signal on line 17 and the magnitude of the signal on line 32 during the preceding cycle.

LSI—(Last Smooth Input)—This is the value of the signal on line 32 during the preceding cycle.

NSI—(New Smooth Input)—The new smooth input is the value of the signal on line 32 during a particular cycle.

The overall performed by the computer 12 is to generate at the beginning of each cycle a signal designated the New Smooth Input (NSI) which is applied to line 32 for an entire cycle. The New Smooth Input signal is generated in accordance with the rules set out below:

(I) When the magnitude of the error signal is *less* than the minimum limit (a) If the change between the actual feedback signal and the last smooth input is *less* than the minimum limit (MINL)

$$NSI = AFS$$

(b) if the change between the actual feedback signal and the last smooth input is *greater* than the minimum limit $$NSI = LSI + \left[\frac{\text{sign of}}{AFS - LSI}\right](MINL)$$

(II) When the magnitude of the error signal is *greater* than the minimum limit (a) if the change between the actual feedback signal and the last smooth input is *less* than the magnitude of the error signal
$$NSI = AFS$$

(b) if the change between the actual feedback signal and the last smooth input is *greater* than the magnitude of the error signal $$NSI = LSI + \left[\frac{\text{sign of}}{AFS - LSI}\right](ERROR)$$

In general, the action of digital computer 12 is similar to the action of a filter that has a response curve which approximates a positive exponential. This is shown in FIGURE 2B. For simplicity FIGURE 2B shows the action of digital computer 12 in an open loop case (i.e. in a situation where line 19 is broken) and a step input signal of 64 units is applied to line 17. It is further assumed that the magnitude of the ERROR signal is initially zero and that the magnitude of the set point reference voltage is held constant. During the first cycle the computer increases the signal on line 32 by the minimum limit MINL of 4 units. During the second cycle the signal on line 32 is again increased by the minimum limit MINL to 8 units. At this point the magnitude of the ERROR signal exceeds the minimum limit MINL; hence, during the next cycle the signal on line 32 is increased by an amount that equals the magnitude of the ERROR signal which is now 8 units. Thus, during the third cycle the signal on line 32 is increased to 16 units. The process repeats until the signal on line 32 equals the signal on line 17. As shown by the dotted line in FIGURE 2B the action of computer 12 approximates the action of a filter that has a response curve that approximates a positive exponential.

Figure 3:
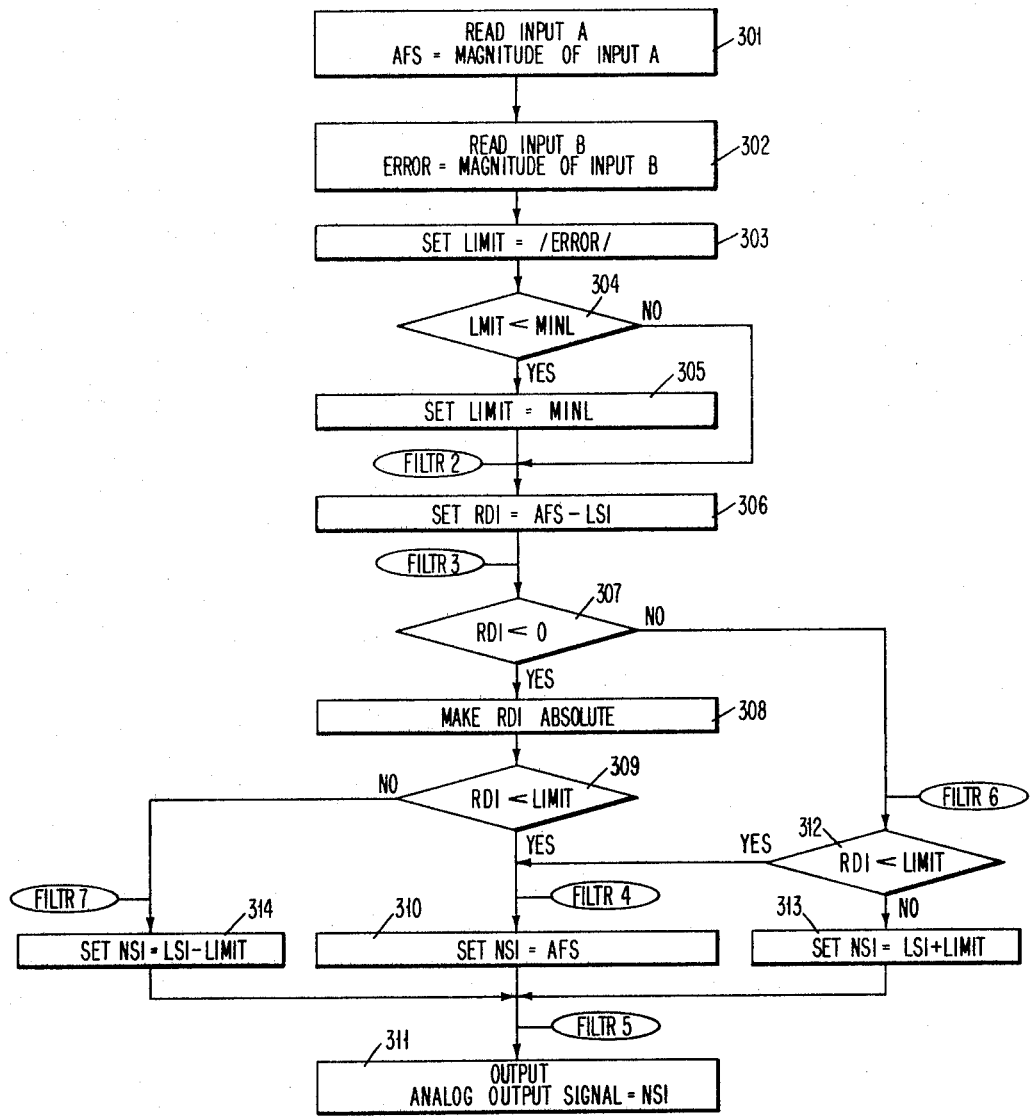
FIGURE 3 is a block diagram showing how the method of the present invention can be implemented with a digital computer.

The sequence of operations which computer 12 performs during each cycle are set out in block diagram form in FIGURE 3. Each block in FIGURE 3 represents an operation (or set of operations) performed by computer 12. Those skilled in the art can easily take the block diagram in FIGURE 3 and the instruction set of any particular digital computer which has analog input and analog output capabilities and provide the necessary detailed machine instructions to perform the operation outlined. Later in this application the specific instructions needed to operate the IBM 1710 in order to perform the functions shown in FIGURE 3 will be given.

First, however, the general function indicated by boxes 301 to 314 in FIGURE 3 will be explained.

Boxes 301 and 302 indicate the sampling of signals on inputs A and B. The signal from input A is designated AFS (actual feed back signal) and the signal from input B is designated ERROR (error signal). Box 303 indicates that the maximum amount that the signal on line 32 can be changed (designated LIMIT) is initially set equal to the absolute value of the signal from input B. Boxes 304 and 305 indicate that the LIMIT is checked to insure that it is larger than the minimum allowable limit (designated MINL). If the LIMIT is not larger than MINL the LIMIT is set equal to the MINL.

Box 306 indicates the calculation of the raw delta input (designated RDI). As previously indicated, the raw delta input RDI, is the amount of difference between the signal appearing at input 17 when input A is sampled (designated AFS) and the magnitude of the signal on line 32 during the preceding cycle (designated ERROR).

After the raw delta input, RDI, is calculated as indicated by box 306, there are four possible sequences of operations. These four sequences are those indicated by the following sequences of boxes.

(1) Boxes 307, 308, 309, 310 and 311
(2) Boxes 307, 312, 310 and 311
(3) Boxes 307, 312, 313 and 311
(4) Boxes 307, 308, 309, 314 and 311

The first possible sequence of steps (i.e. boxes 307, 308, 309, 310 and 311) occurs when the raw delta input RDI is negative and its absolute magnitude is less than the LIMIT. In this case, the new smooth input NSI is merely set equal to the actual feedback signal AFS. The effect is that the computer merely transmits the signal received at input A directly to output C. Box 307 represents a test to determine whether or not RDI is negative, box 308 indicates the operation whereby the negative sign is removed from RDI, box 309 indicates a test to determine whether RDI is greater than the magnitude of the LIMIT, box 310 indicates that the value of the new smooth input NSI is made equal to the value of the actual feedback signal AFS, and box 311 indicates that the output C is activated in accordance with the value of NSI.

The second possible sequence of operations (i.e. boxes 307, 312, 310 and 311) occurs if RDI is positive and the magnitude of RDI is less than the magnitude of the LIMIT, In this case, the new smooth input NSI is again merely set equal to the actual feedback signal AFS whereby the computer in effect directly passes the signal from input A to output C. The only additional box in this series is box 312 which indicates a test to determine whether RDI is less than the LIMIT.

The third possible sequence of operations (i.e. boxes 307, 312, 313 and 311) occurs when the RDI is positive and the magnitude of the RDI is greater than the magnitude of the LIMIT. In this case, the new smooth input NSI is set equal to LSI+LIMIT. The effect is that the signal generated by output C is equal to the sum of the last output signal LSI increased by the maximum allowable value designated LIMIT.

The fourth possible sequence of operations (i.e. boxes 307, 308, 309, 314 and 311) occurs when the raw delta input RDI is negative and its magnitude is greater than the LIMIT. In this case, the new smooth input NSI is decreased by the magnitude of the LIMIT. The effect is that the signal on output C is decreased by the amount equal to the LIMIT. The only additional box in this series is box 314 which indicates the calculation of the new smooth input NSI by a subtraction operation.

The following is a tabulation of the operations indicated by each of the boxes 301 to 311.

Box 301.—The analog signal appearing on input A is gated into the computer and a digital number representative of the magnitude of the analog signal is generated. The number which indicates the magnitude of the signal on input A is designated AFS.

Box 302.—The analog signal appearing on input B is gated into the computer and a digital number representative of the magnitude of this analog signal is generated. The number which indicates the magnitude of the analog signal appearing at input B is designated ERROR.

Box 303.—A provisional limit equal to the absolute value of the ERROR signal is calculated. This provisional limit is designated LIMIT.

Box 304.—A comparison is made to determine whether LIMIT is less than a minimum allowable limit designated MINL. If LIMIT is less than MINL the system next goes to the step indicated by box 305, and if LIMIT is greater than MINL, the system next goes to the step indicated by box 306.

Box 305.—The value of LIMIT is replaced by the value of MINL. Note that this step is only executed when the step indicated by box 304 finds that LIMIT as established by box 303 is less than MINL.

Box 306.—The difference between the signal read from input A and the signal last applied to output C is calculated. This is called the "Raw Delta Input" and it is designated RDI. The raw delta input is calculated by subtracting the last signal applied to output C which is designated LSI from the signal read from input A designated AFS.

Box 307.—A test is made to determine whether the raw delta input RDI is negative. If RDI is negative the system next goes to box 308 and if it is positive the system next goes to box 312.

Box 308.—The number which represents the raw delta input RDI is made positive by eliminating its sign. Note that this step is only executed when the step indicated by box 307 finds that RDI is negative.

Box 309.—A comparison is made between the magnitude of the raw delta input RDI and the magnitude of the LIMIT. If RDI is less than LIMIT, the system goes to the step indicated by box 310 and if it is greater the system goes to the step indicated by box 314.

Box 310.—The new signal which is to be applied to output C designated NSI is calculated by merely making NSI equal AFS.

Box 311.—An analog output signal equal to the new smooth input NSI is generated on output C. It is noted that the signal on line 32 is an analog signal which remains constant during each cycle of the computer until it is changed. After it is changed it remains constant with the new value until changed again. The IBM 1710 System can operate in this manner when it is equipped with a feature "Analog Output Current" RPQ CO–5732.

Box 312.—The raw delta input RDI is compared to the LIMIT to determine whether or not it is smaller than the LIMIT. If the raw delta input is smaller than the LIMIT the system next executes the step indicated by box 310 and if it is not smaller the system next executes the step indicated by box 313.

Box 313.—The new smooth input NSI is calculated by adding the LIMIT to the last smooth input LSI.

Box 314.—The new smooth input NSI is calculated by subtracting the LIMIT from the last smooth input LSI.

The following is the detailed program which would be used to practice the subject invention with an IBM 1710 computer which included the 1711 Data Converter, the 1712 Multiplexer and RPQ CO–5732 analog output. The program given below is in the standard assembly language commonly termed SPS. Readily available assembly programs convert this language into the actual machine instructions. The subroutine given below is activated every one tenth of a second by the interval timer in a conventional manner. While the system is executing this routine, servicing of other interrupts is delayed or masked until the subroutine has been completely executed. The instructions given below are all standard 1710 instructions with the exception of the one instruction which has an OP code designated "88." This instruction is the instruction provided with the above referenced RPQ CO–5732 analog output. The necessary supervisory program and the general techniques of programming the 1710 System are explained in detail in the various programming manuals such as those listed in the IBM Systems Reference Library Publication entitled "1710 Bibliography" Form A26–5695–0. In order to specifically indicate which instructions correspond to which of the blocks in FIGURE 3, comments are provided with each instruction indicating the particular block in FIGURE 3 with which the particular instruction is associated.

FILTER INTERRUPT SUBROUTINE, INITIATED BY TIMER INTERRUPT EVERY ONE TENTH OF A SECOND

```
FLTER     SA                        , 1,          Box 1
          SLAR    AFS               , 2,          Box 1
          SLAR    ERROR             , 0,          Box 2
          TF      LIMIT             , ERROR,      Box 3
          CF      LIMIT             , ,           Box 3
          C       LIMIT             , MINL,       Box 4
          BNL     FLTER 2           , ,           Box 4
          TF      LIMIT             , MINL,       Box 5
FLTER 2   TF      RDI               , AFS,        Box 6
          S       RDI               , LSI,        Box 6
FLTER 3   BNF     FLTER 6           , RDI,        Box 7
          CF      RDI               , ,           Box 8
          C       RDI               , LIMIT,      Box 9
          BNL     FLTER 7           , ,           Box 9
FLTER 4   TF      NSI               , AFS,        Box 10
FLTER 5   TF      DAC+4             , NSI–1,      Box 11
          CF      DAC+2             , ,           Box 11
          88      DAC               , 70001, 1,   Box 11
          BO                        , ,           Box 11
FLTER 6   C       RDI               , LIMIT,      Box 12
          BNH     FLTER 4           , ,           Box 12
          TF      NSI               , LSI,        Box 13
          A       NSI               , LIMIT,      Box 13
          B       FLTER 5           , ,           Box 13
FLTER 7   TF      NSI               , LSI,        Box 14
          S       NSI               , LIMIT,      Box 14
          B       FLTER 5           , ,           Box 14
AFS       DS      4                 , ,
ERROR     DS      4                 , ,
LIMIT     DS      4                 , ,
MINL      DC      4                 , 0006,
RDI       DS      4                 , , ,
LSI       DC      4                 , 0000,
NSI       DS      4                 , 0000,
DAC       DSC     5                 , 0,
```

The above program assumes that the input herein designated A is connected so that it is addressed by the computer as addresses 1, that the report herein designated B is connected so that it is addressed by the computer as address 2, and that the output herein designated C is connected so that it is addressed by the computer as address 70001. The above program is written for execution when the computer is operating in a noninterruptable mode. The third instruction will cause an interrupt signal at some later time; however, this signal has no significance relative to the program under consideration.

The preceding part of the specification has described one specific simplified example of how the method of the present invention can be practiced. Specifically, the previous description related to a system wherein a digital computer was used as a filtering element and the control functions per se were performed by an analog controller. It was assumed that the computer was entirely devoted to performing this one subroutine; hence, there was no need to describe any complicated supervisory routines. The standard executive programs available with the machine could be used to initiate the specified subroutine at the desired one tenth second intervals. Such an application would, however, waste some of the computer's capability. The following briefly explains how this additional capability could be utilized.

In one installation wherein the present invention has been applied, the analog controller was eliminated and the analog signal from the computer was supplied directly to the activator such as the one designated 18 in FIGURE 1. This type of installation is generally termed a direct digital control. The sequence of steps performed by the computer included all of those steps in FIGURE 3. However, before proceeding from the point designated "Flter 5" to the step indicated by box 311, the system performed another series of steps. During these additional steps the computer calculated the ERROR signal by subtracting the new smooth input, NSI, from a number which represented the desired set point value. Next, the computer calculated the magnitude of the desired analog output according to a three mode equation such as:

$$\text{Analog Output} = K_1 E + K_2 \Delta I + \sum K_3 E$$

Where:

E is the magnitude of the ERROR signal,
$\Delta I = LSI - NSI$ (Note LSI is the value calculated in the preceding cycle and NSI is the value calculated during the cycle being considered), $K_1$, $K_2$ and $K_3$ are constants which represent the gains associated with proportional derivative and integral control, respectively. The magnitude of the constants $K_2$ and $K_3$ is a function of the sampling rate since they implicitly contain a measure of the time between samples.

There is one important difference between the three mode equation given above and the three mode equation which describes the typical analog controller. In the equation given above, the derivative part of the control signal operates upon the difference between the last smooth input LSI and the new smooth input NSI. Thus, the derivative portion of the controller does not take into account changes in set point which would be reflected as changes in magnitude of the ERROR signal. This has a distinct advantage in giving a superior output characteristic.

Figure 4A:
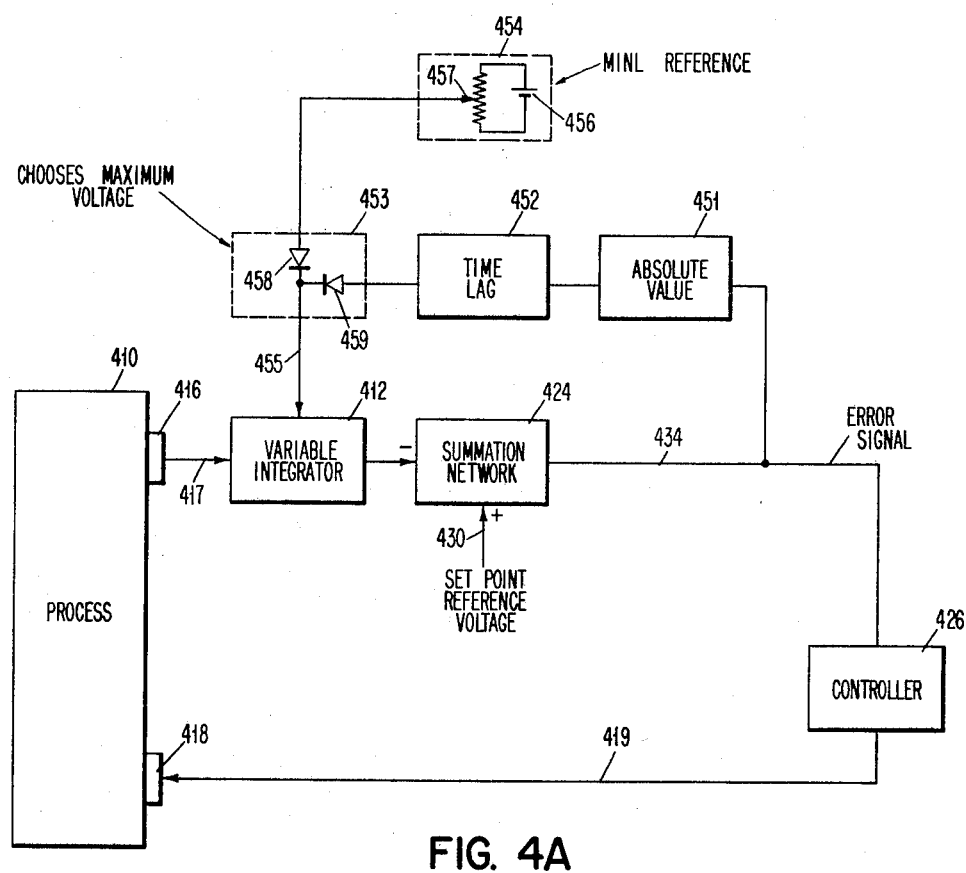
FIGURE 4A is a schematic diagram of an analog system which utilizes the method of control which constitutes the present invention.

The method of the present invention can also be practiced entirely with analog equipment. An analog system which can be used to practice the method of the present invention is shown in FIGURE 4A. The system shown in FIGURE 4A includes a process 410 which has a controllable element 418 and a transducer 416 which indicates the state of the process. The control system includes a conventional three mode analog controller 426 which has associated therewith a summing device 424. The main analog control loop also includes a variable integrator 412. Thus, the main analog control loop comprises variable integrator 412, summing network 424 and controller 426.

Circuit 424 compares a set point reference voltage 430 to the output of the variable integrator 412 and generates a signal on line 434 indicative of any difference. The signal on line 434 is termed the ERROR signal. Controller 426 accepts the ERROR signal and generates a control signal on line 419 in response thereto. Circuit 412 limits the rate at which the signal on line 413 can increase irrespective of the rate of increase of the signal on line 417. The maximum rate at which the voltage on line 413 can change is determined by the magnitude of the signal on line 455. The magnitude of the signal on line 455 is in turn controlled by either the magnitude of the ERROR signal at line 434 or by the magnitude of the signal generated by reference circuit 454. Circuit 453 transmits to line 455 either the signal from circuit 454 or from line 434 depending upon which is larger. The ERROR signal from line 434 is transmitted to circuit 453 through circuits 451 and 452.

Circuit 451 takes the absolute value of the ERROR signal so that the signal on line 455 is always positive. Circuit 452 introduces a time lag into the transmission of signals from line 434 to line 455. The reason for this can be understood with reference to FIGURE 2C where it is shown that the magnitude of the limit is established by the magnitude of the ERROR signal during a preceding time period. The variation in the magnitude of the LIMIT in the circuit shown in FIGURE 4A is not periodical as it was in the first embodiment; however, in the embodiment shown in FIGURE 4A at any particular time the magnitude of the limit is determined by the magnitude of the ERROR signal during a preceding time period due to the time lag introduced by circuit 452. The length of the time lag introduced by circuit 452 is of the same order as the sampling rate in the first embodiment and in a typical case, it could be in the order of one tenth of a second.

The circuit which generates the minimum limit, MINL, includes potentiometer 457 and voltage source 456. The value of the minimum limit can be changed by changing the position of the potentiometer 457. Circuit 453 merely includes two diodes 458 and 459, one of which is reverse biased. Which one is reverse biased depends upon the magnitude of the voltage at the two inputs. Naturally, in a more sophisticated embodiment, circuit 453 could include a comparison circuit which determines which input is greater and a number of gating elements controlled by the comparison circuit which would connect the appropriate input to line 455. Circuit 412 could merely consist of an RC integrating network with a variable resistor, the resistance of which is controlled by the signal on line 455. Such a circuit would however be somewhat non linear. A more nearly linear circuit could be achieved by using transistor circuitry in the form of a Miller integrator. A transistor circuit controlled by the voltage on line 455 could act as a variable resistor in the Miller integrator which in turn would act as a limit on the rate of change.

In general, the circuit shown in FIGURE 4A acts as follows: When a noise signal is introduced onto line 417 from process 410, circuit 412 initially prohibits this increase in voltage from being passed on to line 413 thereby prohibiting the noise signal from causing a change in the control signal on line 419. If the signal on line 417 persists, it will slowly pass through circuit 412. Furthermore, a signal which slowly passes through circuit 412 will slowly increase the magnitude of the ERROR signal. Hence, if the signal persists, the limit introduced by circuit 412 will be increased. As in the first embodiment of the invention, changes in the set point immediately increase the magnitude of the ERROR signal on line 434 thereby immediately initiating control action. Furthermore, after the increased ERROR signal goes through time lag circuit 452 it increases the limit imposed by circuit 412. Hence, in the circuit shown in FIGURE 4A, as in the first embodiment, the controller responds quickly to set point changes but slowly to other signals introduced into the feedback path.

Figure 4B:
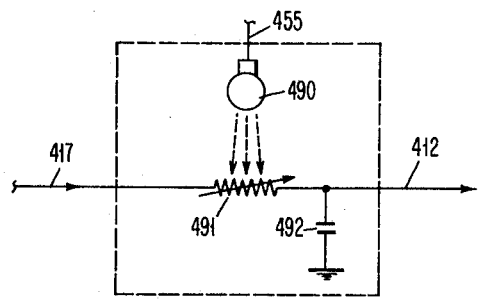
FIGURE 4B is a schematic diagram of one embodiment of the variable integrater shown in block form in FIGURE 4A.

A schematic diagram of an embodiment of variable integrator 412 is shown in FIGURE 4B. It includes a light source 490, a photoresistor 491 and a capacitor 492. The magnitude of the resistance of resistor 491 is a function of the light generated by source 490. Such resistors are commercially available. The light source 490 is controlled by the signal on line 455. Thus, the resistance of resistor 491 is indirectly controlled by the signal on line 455. A large signal on line 455 reduces the RC time constant of the circuit and a small signal on line 455 increases the RC time constant of the circuit. Thus, by properly choosing light source 490 and resistor 491, circuit 412 will have a response curve similar to that shown by the dotted line in FIGURE 2B.

It should be noted that as described herein the magnitude of the LIMIT is made equal to the value of the ERROR signal. This is merely exemplary and other functional relationships between the magnitude of the ERROR signal and the magnitude of the LIMIT could be used.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. A method of controlling a process, said process having associated therewith a controllable element and means for generating a feedback signal indicating the state of said process, the desired value of said feedback signal being designated the set point value, the method of controlling said process comprising the physical steps of:
   physically generating a limited-feedback signal by limiting the rate of change of said feedback signal,
   physically comparing said limited-feedback signal to said set point value and generating an ERROR signal indicative of any difference,
   physically generating a control signal in response to said ERROR signal,
   the limit imposed upon the rate of change of said limited-feedback signal at a particular time being a function of the magnitude of said ERROR signal at a preceding time, whereby said process is held near said set point value.

2. The method of control defined in claim 1 wherein said limit is set equal to a prespecified minimum limit when the magnitude of said ERROR signal is below said prespecified minimum value.

3. A method of controlling a process, said process having associated therewith a controllable element and means for generating a feedback signal indicating the state of said process, the desired value of said feedback signal being designated the set point value, the method of controlling said process comprising the physical steps of:

physically generating a limited-feedback signal by limiting the rate of change of said feedback signal, physically comparing said limited-feedback signal to said set point value and generating an ERROR signal indicative of any difference, generating a control signal in response to said ERROR signal, the limit imposed upon the rate of change of said limited-feedback signal in a particular time period being a function of the magnitude of said ERROR signal during the preceding time period, whereby the change in said limit on an open loop basis approximates a positive exponential and whereby control action is taken quickly in response to changes in said set point and slowly in response to signals from said process.

4. The method of control defined in claim 3 wherein said limit is set equal to a prespecified minimum limit when the magnitude of said ERROR signal is below said prespecified minimum value, whereby the variation in said limit on an open loop basis approximates a positive exponential function only when the magnitude of the ERROR signal is above a certain minimum value.

5. Apparatus for controlling a process, said process having associated therewith a controllable element and means for generating a feedback signal indicating the state of said process, the desired value of said feedback signal being designated the set point value, means for generating a limited-feedback signal by limiting the rate of change of said feedback signal, means for comparing said limited-feedback signal to said set point value and generating an ERROR signal indicative of any difference, means for generating a control signal in response to said ERROR signal, the limit imposed upon the rate of change of said limited-feedback signal at a particular time being a function of the magnitude of said ERROR signal at a preceding time, whereby said process is held near said set point value.

References Cited

UNITED STATES PATENTS

| | | |
|---|---|---|
| 2,668,264 | 2/1954 | Williams. |
| 2,762,385 | 9/1956 | Smerke. |
| 3,075,700 | 1/1963 | Bishop. |
| 3,079,079 | 2/1963 | Phister et al. |
| 3,214,660 | 10/1965 | Smoot. |
| 3,219,936 | 11/1965 | Eksten et al. |

EUGENE G. BOTZ, Primary Examiner